April 1, 1952 A. C. ELD 2,591,343
TRAY FOR FRACTIONATING EQUIPMENT
Filed Aug. 10, 1949
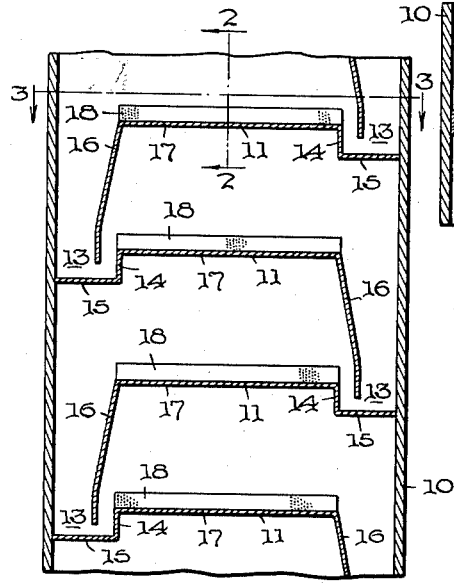
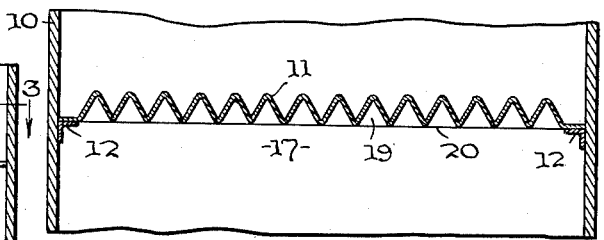
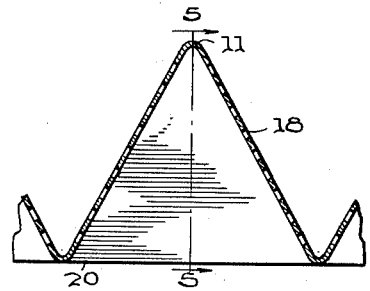
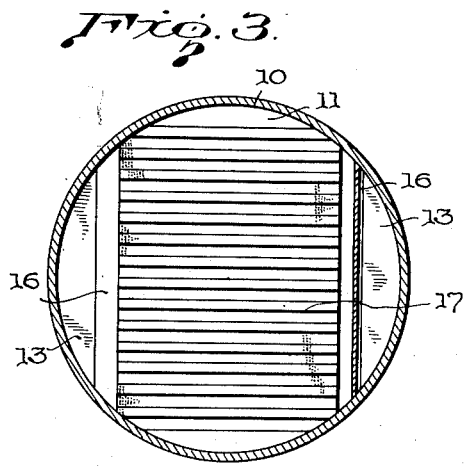
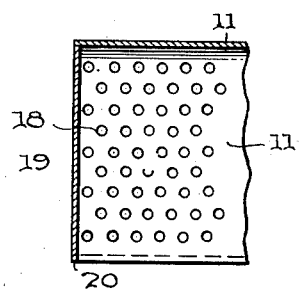
INVENTOR.
AKSEL C. ELD
BY
ATTORNEY Patented Apr. 1, 1952

2,591,343

UNITED STATES PATENT OFFICE 2,591,343

TRAY FOR FRACTIONATING EQUIPMENT

Aksel C. Eld, Mount Lebanon, Pa., assignor to Gulf Oil Corporation, Pittsburgh, Pa., a corporation of Pennsylvania Application August 10, 1949, Serial No. 109,561

3 Claims. (Cl. 261—113)

This invention relates to improvements in trays for fractionating towers, and it comprises more particularly a tray formed with closely set perforations, the perforated surface being corrugated and thereby extended so that a large volume of vapor can be charged without increasing the vapor-mass velocity through a single perforation, and vapor capacity may thereby be increased without increasing the pressure drop or the energy, which is transferred to the liquid suspended in droplets above the tray. The invention further permits a tower of smaller diameter to be employed with resulting economies in construction cost.

The performance of such a tray is sharply distinguished from that of the conventional tray in which vapor is bubbled through a body of retained liquid, or which is designed to cascade the liquid over transverse corrugations, weirs or other obstructions extending across the tray in the path of the vapor, and it is also to be distinguished from perforated trays over which the liquid is distributed to flow through the perforations as a shower and into the path of uprising vapors. In the instant invention no liquid at any time stays on or flows through the corrugated and perforated portion of the tray. Instead, liquid which is discharged onto the tray and starts to flow along the corrugations is at once picked up by the vapor rising through the perforations and is held in suspension, in the form of droplets, above the tray. These suspended droplets are moved toward the downflow section of the tray as others are continually being formed at the inlet side, their travel being in the same direction as that in which the tray corrugations extend. In the region of the downflow section, where the relatively high vapor velocity is not prevalent, they drop out of suspension and the resulting liquid is discharged onto the next lower tray of the series at its inlet.

The corrugated and perforated tray of this invention is useful to fractionating towers in general, but especially to vacuum towers and to towers with large vapor volume. In vacuum and similar towers the volume of liquid feed is usually small and when this liquid feed must be distributed over a large vapor area the problem of good contact and uniform distribution of the entering liquid material is difficult. Thus, an object of the invention is to decrease the plan area of the tray without decreasing the extent of perforate surface. This is accomplished by corrugating the perforate surface, with resulting improved vapor-liquid contact and improved tray efficiency.

Another object of the invention is to provide a tray having a perforated portion which is extended by corrugations, the perforations being distributed substantially uniformly over the entire corrugated surface and in such number that the pressure drop through the tray is low notwithstanding an over-all reduction in plan area.

Still another object of the invention is to achieve the foregoing results in a tower of relatively small diameter, which permits the use of lighter and more simply designed tray supporting members and contributes to a reduction in the construction cost of the fractionator as a whole.

Other objects and advantages will be apparent from the following description and accompanying drawings although it will be understood at the outset that the invention is not limited to details of the tray construction illustrated as the invention is capable of modification and, further, that the phraseology employed is for the purpose of description and not of limitation of the preferred form of the invention.

In the drawings:

Figure 1 is a vertical section of a portion of tower showing the alternating arrangement of trays therein.

Figure 2 is a sectional view taken along line 2—2 of Figure 1.

Figure 3 is a sectional view taken along line 3—3 of Figure 1 and showing one of the trays in plan.

Figure 4 is an enlarged view in section through one of the corrugations of the tray.

Figure 5 is a sectional view taken along line 5—5 of Figure 4.

Referring more particularly to the drawings, a tower 10 has mounted therein a series of spaced, superimposed trays 11 supported on angle iron members 12 (Figure 2).

Each tray is formed with a gutter 13 at the inlet side comprising a depending wall 14 and a bottom 15 which extends to the tower shell. The opposite edge of the tray is directed downwardly to form a downcomer or downflow section comprising an apron or flange 16 which projects into the gutter 13 of the next lower tray of the series and terminates below the normal level of liquid therein. The liquid seal thus provided prevents the vapor from escaping around the edge of the tray and constrains it instead to flow through the central perforated area. This central area 17 is corrugated and is formed with a multiplicity of perforations 18 which are substantially uniformly distributed over the entire corrugated surface from valleys to ridges. The open ends of the corrugations, at their juncture with the straight edges of the gutter and apron, respectively, are closed by imperforate end plates 19, each of which has a straight lower edge and an uper edge conforming in contour to the shape of the corrugations, whereby escape of the vapor at the ends of the corrugations is prevented.

Instead of providing the tray with a gutter-type of liquid seal on the inlet side, other types of sealing arrangements may be used. For example, the liquid inlet may be flat and in the plane of the lower extremities of the corrugations, with a weir-type liquid seal to prevent vapor escaping through the liquid downflow from the tray above. The liquid downflow or outlet section may also be flat and extend to the tower shell, with a tubular downcomer replacing the apron heretofore described.

From the foregoing it will be understood that the improvement of this invention resides principally in corrugating a fractionator tray in an area which is formed with a multiplicity of perforations, rather than in any particular inlet and downflow construction. The increased or extended perforated surface resulting from corrugation permits the construction of a fractionating tower of smaller diameter as compared to one employing flat trays, and the greater number of perforations which may be accommodated in the plan area occupied by the corrugated surface enables a larger volume of vapor to be charged without increase in the velocity of its flow through any individual perforation. As a result, vapor capacity is increased without increasing the pressure drop, and the liquid picked up as droplets is suspended in the space between trays without being entrained in the vapor stream and carried through successive trays.

What I claim as my invention is:

1. In a fractionating tower, a tray provided with liquid inlet means and diametrically opposed liquid downflow means, the tray being formed with corrugations providing unobstructed troughs which extend from the inlet means to the downflow means, the said corrugations being formed with a multiplicity of relatively small and closely spaced perforations substantially uniformly distributed over their entire surface.

2. In a fractionating tower, a tray provided with a liquid inlet means which confines a body of liquid adjacent the edge of the tray and a liquid downflow means diametrically opposed thereto and adapted to extend into the body of liquid in the inlet means of the next lower tray to convey liquid thereto and to form a liquid seal, corrugations in the tray extending lengthwise from the liquid inlet to the downflow means, said inlet and downflow means presenting spaced walls the upper edges of which are conformed to the cross-sectional outline of the corrugations and which extend into the ridge portions of the corrugations between adjacent troughs, thereby to leave the troughs as unobstructed channels opening into the inlet and downflow means at either end, the said corrugations being formed with a multiplicity of relatively small and closely spaced perforations uniformly distributed thereover.

3. In a fractionating tower, a tray having corrugations extending thereacross between an inlet for liquid from a higher tray in series to an outlet communicating with the next lower tray, the troughs of said corrugations being in unobstructed communication with said inlet and outlet and open thereto at the level of the bottom of each such trough whereby liquid is not retained therein, the ridges and troughs of said corrugations being formed with a multiplicity of relatively small and closely spaced holes uniformly distributed thereover for passage of upflowing vapor.

AKSEL C. ELD.

REFERENCES CITED

The following references are of record in the file of this patent:

UNITED STATES PATENTS

| Number | Name | Date |
| --- | --- | --- |
| 1,605,263 | Millard | Nov. 2, 1926 |
| 1,659,403 | Nicholls | Feb. 14, 1928 |
| 1,782,735 | MacKenzie | Nov. 25, 1930 |
| 1,882,104 | Wallis | Oct. 11, 1932 |
| 2,339,561 | Durrum | Jan. 18, 1944 |

FOREIGN PATENTS

| Number | Country | Date |
| --- | --- | --- |
| 709,948 | France | Aug. 14, 1931 |